United States Patent
Schadlich et al.

(10) Patent No.: US 11,572,937 B2
(45) Date of Patent: Feb. 7, 2023

(54) BALL DEFLECTOR FOR A BALL SCREW

(71) Applicant: SFS intec Holding AG, Heerbrugg (CH)

(72) Inventors: Andre Schadlich, Haag (CH); Stefan Frei, Widnau (CH); Daniel Sinz, Kennelbach (AT); Marijo Zach, Widnau (CH)

(73) Assignee: SFS intec Holding AG, Heerbrugg (CH)

( * ) Notice: Subject to any disclaimer, the term of this patent is extended or adjusted under 35 U.S.C. 154(b) by 27 days.

(21) Appl. No.: 16/220,559

(22) Filed: Dec. 14, 2018

(65) Prior Publication Data
US 2019/0186606 A1    Jun. 20, 2019

(30) Foreign Application Priority Data

Dec. 14, 2017  (EP) .................................. 17207232

(51) Int. Cl.
*F16H 25/22*    (2006.01)
(52) U.S. Cl.
CPC ..... *F16H 25/2223* (2013.01); *F16H 25/2214* (2013.01); *F16H 25/2228* (2013.01)
(58) Field of Classification Search
CPC ......... Y10T 74/19767; Y10T 74/19772; F16H 25/2214; F16H 25/2223; F16H 25/2228
See application file for complete search history.

(56) References Cited

U.S. PATENT DOCUMENTS

| | | | | |
|---|---|---|---|---|
| 6,561,053 B2 * | 5/2003 | Greubel | ............. | F16H 25/2219 74/424.82 |
| 8,534,152 B2 * | 9/2013 | Hsu | .................... | F16H 25/2214 74/424.86 |
| 8,739,646 B2 * | 6/2014 | Nishimura | .......... | F16H 25/2247 74/424.87 |
| 9,377,093 B2 * | 6/2016 | Fujita | .................. | F16H 25/2219 |
| 9,573,618 B2 * | 2/2017 | Ito | ....................... | F16H 25/2219 |
| 9,927,011 B2 * | 3/2018 | Iwasaki | ............... | F16H 25/2223 |
| 2004/0045388 A1 * | 3/2004 | Sugita | ................. | F16H 25/2223 74/424.87 |
| 2006/0196291 A1 * | 9/2006 | Yoshioka | ............ | F16H 25/2223 74/424.87 |
| 2006/0207361 A1 * | 9/2006 | Kazuno | ............... | F16H 25/2223 74/89.44 |

(Continued)

FOREIGN PATENT DOCUMENTS

| | | |
|---|---|---|
| DE | 202011001752 | 6/2011 |
| EP | 1375966 | 1/2004 |

(Continued)

*Primary Examiner* — Bobby Rushing, Jr.
(74) *Attorney, Agent, or Firm* — Volpe Koenig

(57) ABSTRACT

A ball screw including a threaded spindle and a spindle nut has a ball deflector arranged in an opening in the lateral surface of the spindle nut. The ball deflector is formed with an upper shell and a lower shell, the lower shell being arranged radially inwardly closer to the spindle nut longitudinal axis than the upper shell. The lower shell has a substantially half-shell-shaped contour. Both the upper shell and the lower shell are fastened in the spindle nut without any further, discrete mechanical fastening elements, and the ball deflector formed thereby does not protrude beyond the outer contour defined by the spindle nut.

15 Claims, 4 Drawing Sheets

(56) References Cited

U.S. PATENT DOCUMENTS

| | | | |
|---|---|---|---|
| 2007/0196189 A1* | 8/2007 | Sugita | F16H 25/2223 409/65 |
| 2011/0303036 A1* | 12/2011 | Chen | F16H 25/2214 74/424.83 |
| 2017/0292591 A1* | 10/2017 | Iwasaki | F16H 25/2219 |
| 2017/0335934 A1* | 11/2017 | Shimizu | F16H 25/24 |

FOREIGN PATENT DOCUMENTS

| | | | |
|---|---|---|---|
| JP | H0687762 | 12/1994 | |
| JP | 2009024843 A * | 2/2009 | ......... F16H 25/2214 |
| JP | 2016017544 | 2/2016 | |
| WO | 2014184154 | 11/2014 | |
| WO | 2016190145 | 12/2016 | |

* cited by examiner

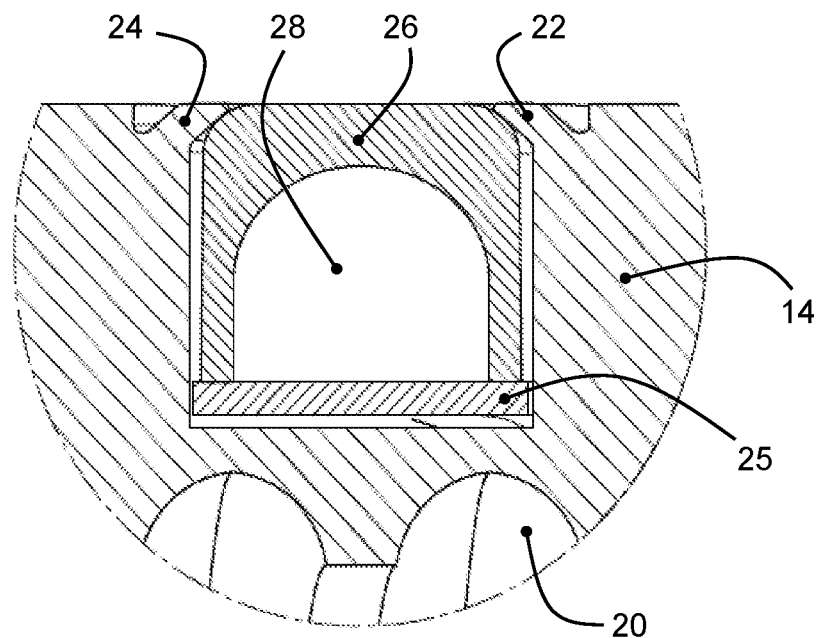
Fig. 5
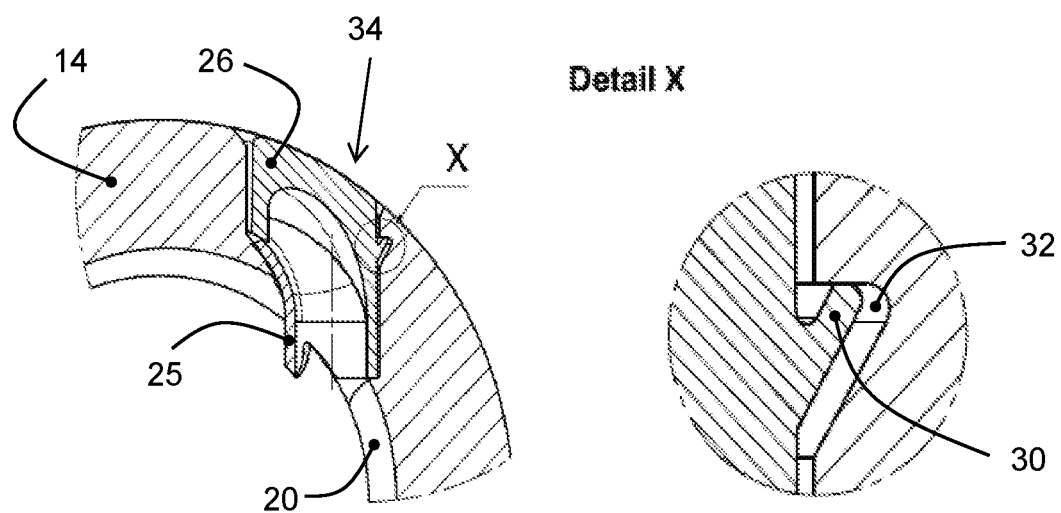
Fig. 6
Fig. 7

BALL DEFLECTOR FOR A BALL SCREW

INCORPORATION BY REFERENCE

The following documents are incorporated herein by reference as if fully set forth: European Patent Application No. 17207232.4, filed Dec. 14, 2017.

BACKGROUND

The present invention is concerned with a ball screw, in particular a highly simplified ball deflector for a ball screw.

A ball screw usually refers to a rolling screw drive with balls as the rolling elements. In technical terms, a ball screw functions like a helical gearing, the gear ratio of which is defined by the dimensioning of the threaded spindle, more precisely by the pitch of the thread.

Ball screws are used in many technical applications, especially in mechanical engineering and preferably in machine tools. However, ball screws are increasingly being used as longitudinal drives in fields where previously hydraulic systems were mostly used, e.g. in presses, injection-moulding machines and power steering systems. In addition, ball screws are also playing an increasingly important role in electromechanical and electrohydraulic braking systems, where ball screws are used as a replacement for hydraulic braking cylinders or in parallel with known braking systems as an actuation element of a brake assist system.

PRIOR ART

A ball screw according to the prior art is disclosed in WO 2014/184154 and reproduced in FIG. 1. The main parts of the ball screw 10 include a threaded spindle 12 and a spindle nut 14 fitting around said spindle. During operation, balls circulate between these two components, the threads of the threaded spindle 12 and of the spindle nut 14 being complementary to each other such that they act as ball guides.

The spindle nut 14 consists of a nut body which has an opening 17 for a ball deflector 15, 16. This ball deflector 15, 16 has the task of lifting the balls out of the ball guide between the spindle nut 14 and the threaded spindle 12 at a first location and returning them at a second location. The ball return is therefore a bypass which bridges multiple threads of the nut-spindle system. This produces a closed circulation path for the balls of the ball screw 10.

The ball deflector 15, 16 according to the cited prior art is substantially in two parts. The first part 16 is substantially U-shaped and has a half-pipe-shaped cross-section, at least in some sections. The second part 15 complements the first part 16 in that a tubular contour is formed at least at the ends of the deflection means.

The assembly process for the ball deflector of this ball screw type proceeds such that the first part 16 of the ball deflector is inserted into the opening 17 in the spindle nut 14, then the second part 15 is added so that the second part is situated radially further outwards than the first part. A sleeve 18 is pushed on to secure the first part 16 and the second part 15 of the ball deflector.

The ball deflector of a ball screw is a very complex component, in terms of both production and assembly outlay. Accordingly, the design with two parts plus a securing sleeve is a disadvantage of the indicated prior art. The sleeve must exert a defined force on the ball deflector 15, 16, which force must not be too small, because reliable ball-guiding cannot be guaranteed if retention is inadequate. Conversely, an excessive holding force can deform the ball recirculation channel and impair the function of the ball screw as a whole. In addition, the sleeve must be pushed on during assembly in such a controlled manner that the components 15 and 16 are not displaced or damaged.

SUMMARY

The object of the present invention is therefore to improve the prior art with the objective of simplifying the design and at the same time increasing assembly safety.

The present invention meets this objective by replacing the sleeve 18 and simplifying the design of the ball circulation components.

Common to all the variants below is the construction of the ball circulation channel 28 by two main components, which are referred to below as upper shell 26 and lower shell 25. A spindle nut 14 as discussed throughout the present invention has, as known from the prior art, an internal thread which, together with the complementary ball thread of a threaded spindle 12, guides the balls in the ball circulation flutes between the spindle and the nut. To provide the function of a ball screw, a ball deflection channel 28 must be created, which allows the balls of a ball screw to return between two defined thread positions of the spindle nut. Only one or multiple turns can be bridged here. Also possible and often desired is an oblique course of the ball deflection channel, so that the balls do not have to be deflected by 90° after being lifted out of the thread, but rather can be returned at an acute angle to the thread. Ball screws can have one or more ball deflection channels. To create space for the ball recirculation channel, it is customary and known to provide one or more openings in the nut body 19 of the spindle nut 14. In the present invention, one slot-like opening is used per ball deflector, at each longitudinal end of which opening the nut body 19 is perforated radially inwards, and thus the ball circulation flute 20 of the spindle nut has two openings. Between these two holes, the opening 17 in the nut body 19 is in the form of a trough which made at least so deep that the balls and the components of the ball circulation channel 28 have space therefor.

In other words, a ball screw comprises a threaded spindle 12 and a spindle nut 14 which coaxially at least partially encloses the threaded spindle 12. A plurality of balls circulates in the interstice between the threaded spindle 12 and the spindle nut 14. An opening 17 in the lateral surface of the spindle nut 14 receives a ball deflector which is in at least two parts and comprises an upper shell 26 and a lower shell 25. The lower shell 25 is arranged radially closer to the spindle nut longitudinal axis than the upper shell 26. The lower shell has a substantially half-shell-shaped contour. Half-shell-shaped in this case means in principle in the form of a "tube divided lengthways"; the division does not have to be exactly half. Depending on the design of the ball screw, a rather shallow design of the lower shell can be sufficient or preferred, similar to a groove. It is essential to the present invention that the upper shell 26 and the lower shell 25 are fastened in the spindle nut 14 without further, discrete mechanical fastening means. Preferably, the assembly of lower shell 25 and upper shell 26 mounted in the spindle nut 14 does not protrude beyond the outer contour defined by the spindle nut. Without further discrete, mechanical fastening means in this case means that no screw-fastenings, additional clamping and auxiliary means such as sleeves, straps etc. are necessary to complete the ball deflector functionally.

Preferably, the lower shell 25 is in the form of a moulded part, a deep-drawn part, a punched or stamped part or an injection-moulded part. The preferred choice of material is sheet steel, but high-strength plastics could also be used. Depending on the design of the ball screw, the lower shell will have elements which, when installed, project into the ball circulation means between the nut and the spindle and allow the balls to be lifted out and returned. These can be tongue-like or spoon-like end sections which facilitate low-friction deflection of the balls.

Within the context of the present invention, the lower shell 25 and the spindle nut 14 are connected by fusing, caulking, clamping, spot-welding or laser welding.

The design of the upper shell can be different, in terms of both the technical design and the choice of material. In a first embodiment for the upper shell 26, it is in the form of a moulded part, a deep-drawn part, a punched or stamped part or an injection-moulded part made of metal or plastic. Analogously to the lower shell, the upper shell 26 and the spindle nut 14 are preferably connected by fusing, caulking, clamping, spot-welding or laser welding. The feature "without further, discrete mechanical fastening means" is thus fulfilled.

Alternatively to fusing or clamping, the upper shell 26 and the spindle nut 14 can be connected by a locking element, such as a clip mechanism. To this end, a spring element 30 is preferably provided on the upper shell 26, which spring element engages in a groove 32 in the side wall of the opening 17 in the spindle nut 14 and secures the upper shell 26 in a defined position in the opening 17 when in the assembled state. The groove or alternatively longitudinal flute, wall opening or undercut can be made when the opening 17 is produced.

Alternatively to fusing or clip connection, the opening 17 can have side walls which are inclined conically inwards towards the outer face of the spindle nut 14 so that the bottom of the opening has a larger clearance than the edge of the opening 17 on the surface of the spindle nut. Complementary formation of the upper shell can thus achieve a clamping effect which likewise manages without further mechanical fastening means.

A further simplification provided by the invention is in designing the ball deflection channel so that the upper shell and the lower shell do not form a closed tube or a closed tunnel. For the sake of material savings and reduced outlay, the upper shell and the lower shell can be designed such that they only form a contoured roof and bottom, and the side walls of the opening 17 act directly as guide aids for the balls. Therefore, the ball deflection channel 28 is formed at least in some sections by the upper shell 26, the lower shell 25 and the side walls of the opening 17 when in the assembled state.

Alternatively to the design in sheet metal or metal, the upper shell 26 can be in the form of a plastic part. In one embodiment of the invention, this plastic part can be designed such that it is largely functionally and structurally based on a sheet metal part. However, in a development of the invention, the upper shell can also be designed or extended such that it encloses the spindle nut and thus forms the final surface of the spindle nut. In this case, "enclose" can mean both partially and completely surrounding the spindle nut. Within the context of the invention, this extended upper shell 40 is in one piece, that is, the upper part of the ball deflection means and the enclosure of the spindle nut form an inseparable unit. Since the ball deflection means does not protrude beyond the final outer contour of the nut body in this embodiment either, this feature of the invention is retained.

This embodiment can preferably be implemented such that an insert part based on the upper shell 26 as described above is placed in the opening 17. It terminates the ball deflection channel 28 and/or the opening 17 towards the outside. The single-piece, extended upper shell 40 is integrally formed by subsequent overmoulding of the spindle nut 14. The insert part is preferably designed such that the closest, most secure possible connection to the plastic can be achieved during overmoulding.

Alternatively, the extended upper shell can be produced in a single piece as a separate component and in this case also has the functional elements which can be provided by the upper shell of the ball deflector. The ball circulation is completed by pushing this onto a spindle nut 14 having the pre-assembled elements of the lower shell. Fixing in a desired position can be achieved e.g. in that the functional elements latch into the opening 17 and thus ensure that the extended upper shell 40 fits securely.

In process terms, the method steps for assembling a ball screw up to and including the lower shell are the same in all the described variants of the present invention:

Providing a spindle nut 14;

Inserting a lower shell 25 into an opening 17 in the spindle nut in a desired position. This will vary depending on the design of the ball screw; the specification that the ball deflection means must not protrude beyond the outer contour defined by the spindle nut likewise applies.

Fastening the lower shell 25 to the spindle nut 14 by fusing, caulking, clamping, spot-welding or laser-welding.

An upper shell 26 is then arranged in the opening 17 in a desired position. If the upper shell 26 is formed as a shaped sheet metal part or as a corresponding plastic part, it is fastened to the spindle nut 14 according to the invention only by fusing, caulking, clamping, spot-welding or laser-welding, without any further, discrete, mechanical fastening means.

Alternatively, an extended upper shell 40 formed of plastic can be provided, which is mounted by simply pushing it onto the spindle nut 14. The outer contour of the spindle nut is thus defined by the upper shell or extended upper shell.

Alternatively to the described fastening types, an upper shell 26 can have a functional element in the form of a spring element 30, and a groove 32 (longitudinal flute, undercut, wall opening) can be provided in a corresponding desired position in the opening 17 in the spindle nut 14. This upper shell can be inserted into the opening 17 in the spindle nut 14 until the spring element 30 engages in a locking manner into the groove 32, and the upper shell 26 is thus held in a defined position.

As a third fastening alternative, the plastic upper shell 26 can be elastically deformable and be inserted into the conical opening 17 in the spindle nut 14 such that a clamping fit is achieved in the desired end position. By being briefly pushed together, the upper shell can temporarily fit the opening, which is narrower at the surface, and thus be mounted.

In the above-described embodiment of a ball screw as an over-moulded component, the plastic upper shell 26 or the insert part will be a semi-finished product, and the partially assembled ball screw will be inserted into a die of a plastic injection-moulding machine. The die at least partially encloses the spindle nut 14. Then the spindle nut is over-moulded, as a result of which the upper shell 26 becomes an integral constituent of an extended upper shell 40.

BRIEF DESCRIPTION OF THE DRAWINGS

FIG. 5 shows the spindle nut 14 with a ball deflection channel in a caulked design in a cross-sectional view.

FIG. 6 shows a cross-sectional view taken along the sectional plane Q at the end of a ball deflection channel, having an anchoring with a click-in design.

FIG. 7 shows a detail X from FIG. 6.

DETAILED DESCRIPTION

The invention is now explained by way of example using embodiments, with reference to the attached drawings.

Figure 1:
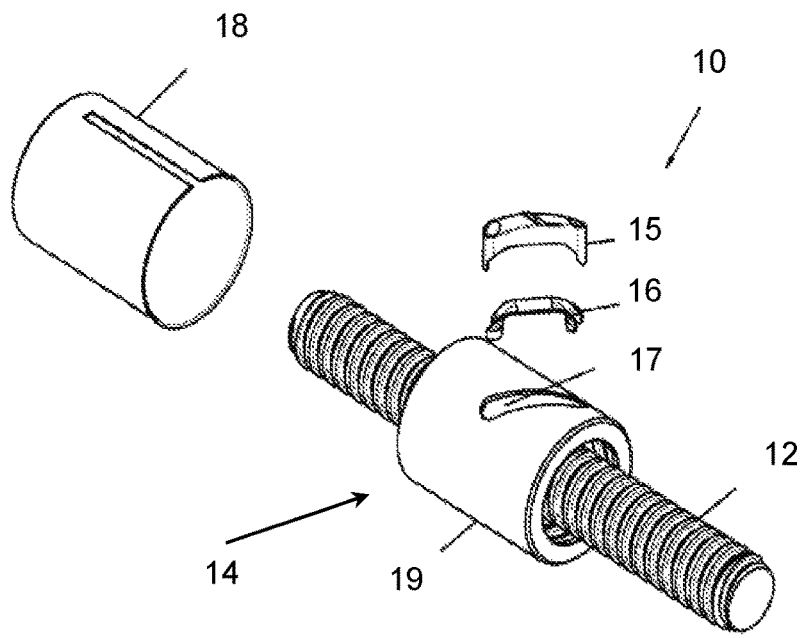
FIG. 1 shows a ball screw according to the prior art.
Figure 2:
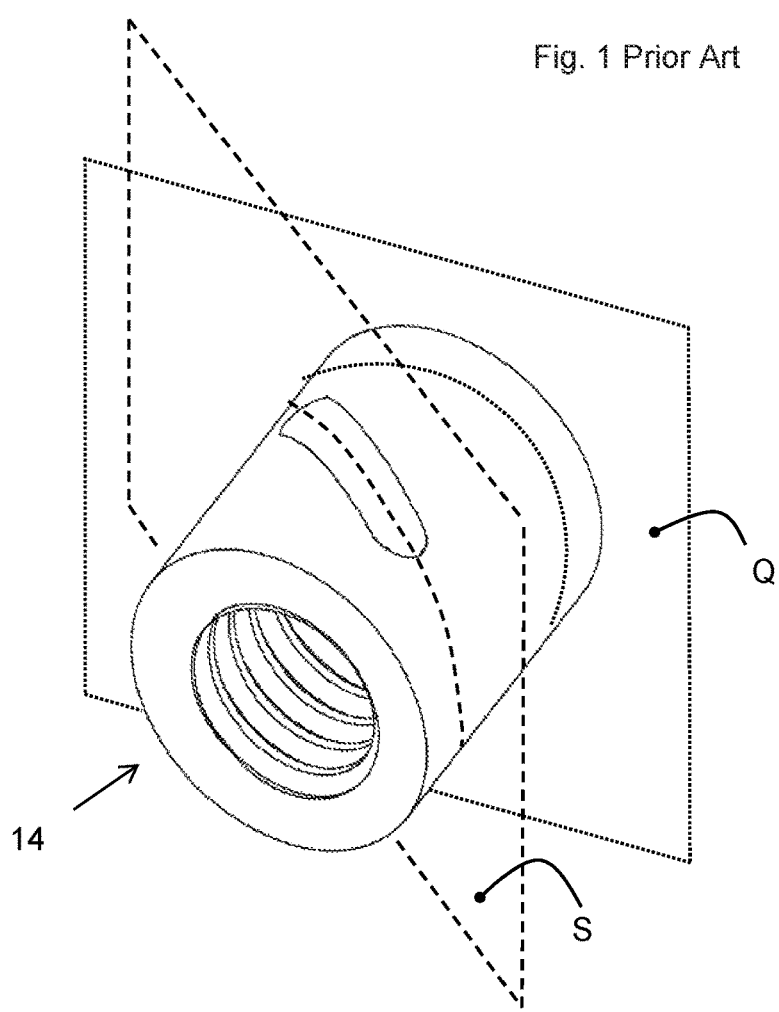
FIG. 2 shows a spindle nut 14 in a perspective plan view with a sectional plane Q and an oblique sectional plane S.

FIG. 1 shows a ball screw 10 according to the prior art and has already been explained above. FIG. 2 is used to understand the sectional planes of FIGS. 3-9 better. The position of a cross-sectional plane and of an oblique sectional plane are indicated. The oblique sectional plane S is designed such that it intersects a ball deflection channel, running in an opening 17, lengthways.

Figure 3:
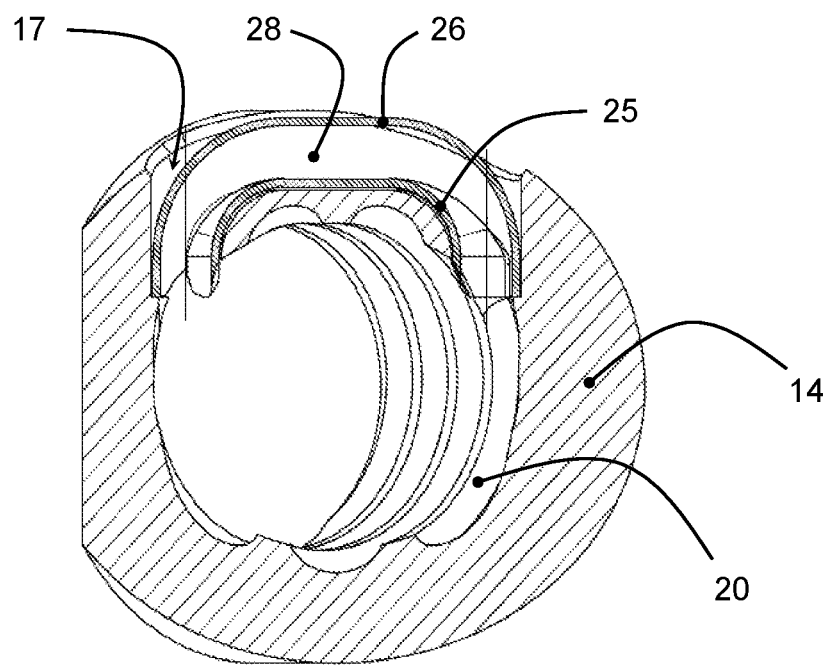
FIG. 3 shows a spindle nut 14 in an oblique section view along the sectional plane S, according to one embodiment of the invention.

FIG. 3 shows an embodiment of a ball screw according to the invention having a spindle nut 14 in oblique section S, which also shows the ball deflection flutes 20. A ball deflector is mounted in the opening 17 without a sleeve 18 and forms the ball deflection channel 28. The lower shell 25 is a half-shell design, a relatively shallow component. The upper shell 26 is likewise shown as a shallow shaped sheet metal part. The longitudinal ends are supported on protrusions made in the opening.

Figure 4:
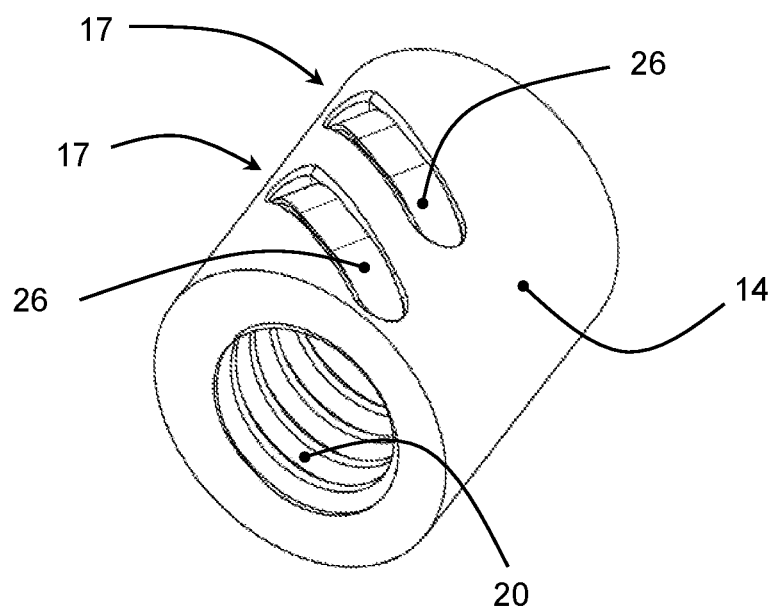
FIG. 4 shows the spindle nut 14 in a perspective view, according to one embodiment of the invention.

FIG. 4 shows this variant in a view from above. The upper shell(s) 26 cover the opening(s) 17. According to the invention, no further securing straps, screw-fastenings or securing sleeves are necessary.

FIG. 5 shows the "caulking" fastening type in cross-section. A relative shallow lower shell 25 and an upper shell 26 with a tunnel profile for the ball deflection channel 28 are arranged in the opening 17 in the spindle nut 14. The caulking process has formed two protrusions, noses or webs 22, 24 on the edge of the opening, which secure the ball deflector in place.

FIGS. 6 and 7 show the fastening type with a clip or spring element 30 in a groove 32. The assembly or insertion direction is indicated by an arrow 34. The locking occurs when the spring element 30 can engage in the groove 32.

Figure 8:
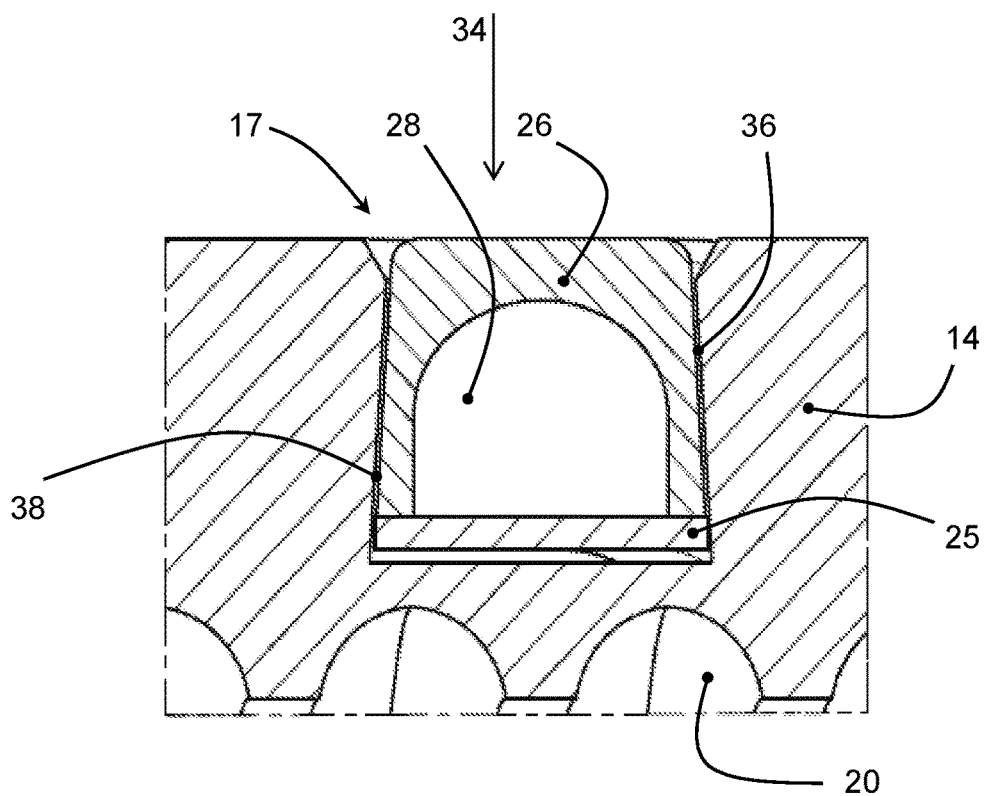
FIG. 8 shows the fixing of an upper shell in an opening having conically tapering walls.

FIG. 8 illustrates the fastening type of a combination of lower shell 25 and upper shell 26 in an opening 17 with upwardly (radially outwardly) conically tapering side walls 36, 38. The achieved clamping fit of the upper shell 26 can clearly be seen.

Figure 9:
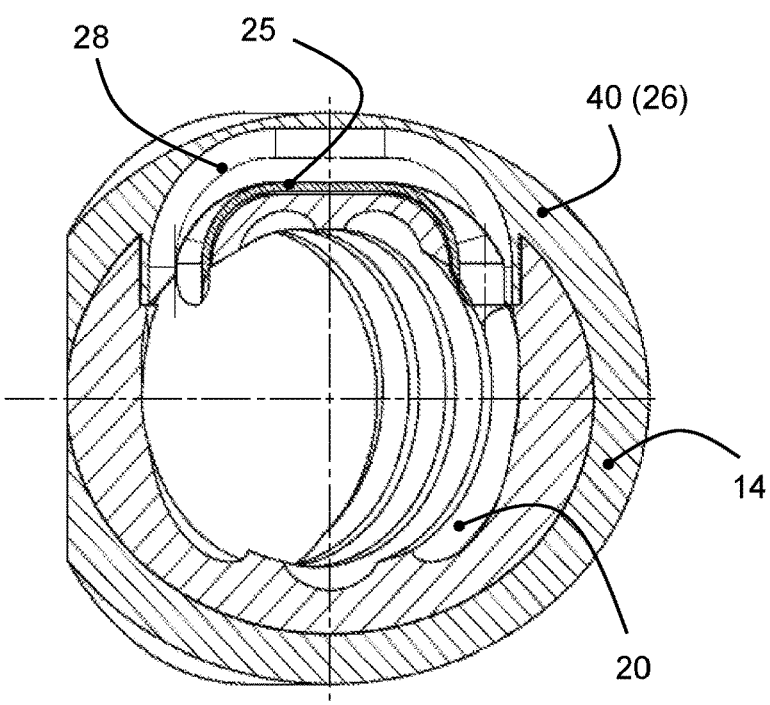
FIG. 9 shows, along a sectional plane S, a spindle nut 14 with an over-moulded design with an extended upper shell 40.

FIG. 9 shows a ball nut 14 which is over-moulded with plastic and thus obtains an extended upper shell 40. The lower shell 25 is installed as described above, while the upper half of the ball deflection channel 28 is produced as a single piece by the injection-moulding process, in which an inserted semi-finished product or insert part has predefined the upper shell.

The features of the invention disclosed in the above description, in the drawings and in the claims can be essential to the realisation of the invention both individually and in any desired but technically practical or advantageous combination.

LIST OF REFERENCE SYMBOLS

10 Ball screw
12 Threaded spindle
14 Spindle nut
15 Ball deflector, second part
16 Ball deflector, first part
17 Opening
18 Sleeve
19 Nut body
20 Ball circulation flute in spindle nut
22, 24 Nose, web
25 Lower shell
26 Upper shell
28 Ball deflection channel
30 Spring element
32 Groove, flute, undercut
34 Assembly direction
36, 38 Side wall (of opening 17 in spindle nut 14)
40 Extended upper shell

The invention claimed is:

1. A ball screw, comprising:
a threaded spindle (12);
a spindle nut (14) that coaxially at least partially encloses the threaded spindle (12);
a plurality of balls adapted to circulate in an interstice between the threaded spindle (12) and the spindle nut (14);
a ball deflector arranged in an opening (17) in a lateral surface of the spindle nut (14), the ball deflector comprising an upper shell (26) and a lower shell (25), the lower shell (25) being arranged radially inwardly closer to a longitudinal axis of the spindle nut than the upper shell (26);
the lower shell having a substantially half-shell-shaped contour; and
the upper shell (26) and the lower shell (25) are fastened in the spindle nut (14) without discrete, mechanical fastening elements by fusing, caulking, spot-welding or laser welding at least one of the upper shell or the lower shell to the spindle nut.

2. The ball screw according to claim 1, wherein the lower shell (25) and the upper shell (26) mounted in the spindle nut (14) does not protrude beyond an outer contour defined by the spindle nut.

3. The ball screw according to claim 1, wherein the lower shell (25) comprises a moulded part, a deep-drawn part, a punched or stamped part, or an injection-moulded part, and is formed of metal or plastic.

4. The ball screw according to claim 1, wherein the lower shell (25) and the spindle nut (14) are connected by the fusing.

5. The ball screw according to claim 4, wherein the upper shell (26) and the spindle nut (14) are connected by the fusing.

6. The ball screw according to claim 1, wherein the upper shell (26) comprises a moulded part, a deep-drawn part, a punched or stamped part, or an injection-moulded part, and is formed of metal or plastic.

7. The ball screw according to claim 1, wherein the upper shell (26) and the spindle nut (14) are connected by a locking element comprising a spring element (30) on the upper shell (26) which, in an assembled state, engages in a groove (32) in a side wall of the opening (17) in the spindle nut (14) and secures the upper shell (26) in a defined position in the opening (17).

8. The ball screw according to claim 1, wherein the opening (17) is defined by side walls which are inclined conically inwards towards an outer face of the spindle nut (14) such that a bottom of the opening has a larger clearance than at an edge of the opening (17) at a surface of the spindle nut.

9. The ball screw according to claim 1, wherein a ball deflection channel (28) is formed at least in some sections by the upper shell (26), the lower shell (25) and side walls that define the opening (17) in an assembled state.

10. The ball screw according to claim 9, wherein the upper shell is an extended upper shell (40) which is formed of plastic, in a single piece, and is formed so as to entirely or mostly enclose the spindle nut (14) in an annular manner.

11. The ball screw according to claim 10, further comprising an extended upper shell (40) including an insert part for the opening (17), said insert part terminates at least one of the ball deflection channel (28) or the opening (17) to outside and is formed integrally to the single-piece, extended upper shell (40) by overmoulding the spindle nut (14).

12. The ball screw according to claim 1, wherein the lower shell (25) and the spindle nut (14) are connected by the caulking.

13. The ball screw according to claim 12, wherein the upper shell (25) and the spindle nut (14) are connected by the caulking.

14. The ball screw according to claim 1, wherein the lower shell (26) and the spindle nut (14) are connected by the spot-welding or laser welding.

15. The ball screw according to claim 14, wherein the upper shell (26) and the spindle nut (14) are connected by the spot-welding or laser welding.

\* \* \* \* \*